United States Patent [19]

Dick

[11] Patent Number: 4,754,664
[45] Date of Patent: Jul. 5, 1988

[54] FOUR RANGE HYDROMECHANICAL TRANSMISSION

[75] Inventor: Wesley M. Dick, Sylvania, Ohio

[73] Assignee: Dana Corporation, Toledo, Ohio

[21] Appl. No.: 934,246

[22] Filed: Nov. 20, 1986

[51] Int. Cl.$^4$ .......................................... F16H 47/04
[52] U.S. Cl. ............................................. 74/687; 74/682
[58] Field of Search ................ 74/687, 682, 681, 769, 74/720.5, 768, 720

[56] References Cited

U.S. PATENT DOCUMENTS

| | | | |
|---|---|---|---|
| 3,534,632 | 10/1970 | Smith | 74/687 |
| 3,597,997 | 8/1971 | Phillips | 74/687 |
| 3,597,998 | 8/1971 | Ebert | 74/687 |
| 3,714,845 | 2/1973 | Mooney, Jr. | 74/687 |
| 3,783,711 | 1/1974 | Orshansky, Jr. | 74/687 |
| 3,897,697 | 8/1975 | Chambers et al. | 74/682 |
| 3,969,957 | 7/1976 | DeLalio | 74/687 |
| 3,979,972 | 9/1976 | Sakai et al. | 74/687 |
| 3,982,448 | 9/1976 | Polak et al. | 74/687 |
| 4,116,089 | 9/1978 | Orshansky, Jr. et al. | 74/687 |
| 4,164,156 | 8/1979 | Reed | 74/687 |
| 4,306,467 | 12/1981 | Pollman | 74/687 |
| 4,341,131 | 7/1982 | Pollman | 74/687 |

Primary Examiner—Leslie A. Braun
Assistant Examiner—David Novais
Attorney, Agent, or Firm—MacMillan, Sobanski & Todd

[57] ABSTRACT

A hydromechanical transmission provides four gear ranges, the first of which provides a reverse gear range and a low gear range, and the fourth of which is an overdrive range. The transmission utilizes either four or five planetary gearsets and four sequentially actuated clutches, two of which act as brakes. The hydraulic section uses a fixed displacement hydraulic unit and a variable displacement hydraulic unit which alternately act as a pump or a motor. The hydraulic section adds to or substracts from the mechanical gear ratio in a differential arrangement which also acts as range gearing to provide an infinitely variable transmission. Most or all rotating elements move as a unit at three operating points, idle, mid-second-gear, and direct drive, to reduce losses at typical operating points and allow a stepless transition to a locked direct drive.

8 Claims, 6 Drawing Sheets

PLANET GEAR SPEEDS
(FIG. 1 EMBODIMENT)

CLUTCH DIFFERENTIAL SPEEDS
(FIG. 1 EMBODIMENT)

RING SUN & CARRIER SPEEDS
(FIG. 1 EMBODIMENT)

PERFORMANCE CHARACTERISTICS
(FIG. 1 EMBODIMENT)

PLANET GEAR SPEEDS
(FIG. 7 EMBODIMENT)

CLUTCH DIFFERENTIAL SPEEDS
(FIG. 7 EMBODIMENT)

RING SUN & CARRIER SPEEDS
(FIG. 7 EMBODIMENT)

PERFORMANCE CHARACTERISTICS
(FIG. 7 EMBODIMENT)

FOUR RANGE HYDROMECHANICAL TRANSMISSION

BACKGROUND OF THE INVENTION

The present invention relates to the field of hydromechanical transmissions utilizing both hydraulic and mechanical transmission paths between a rotating input and a rotating output.

A hydromechanical transmission is an infinitely-variable transmission and thus, may be used with a fixed or variable speed input rotation to provide a fixed or variable speed output rotation. This characteristic is useful for increasing the operating efficiency of both fixed and vehicular applications, since a power source may be operated near its most efficient speed, and the hydromechanical transmission controlled to provide a required range of output rotations. For instance, a turbine engine has a rather narrow range of peak efficiency, while an internal-combustion engine has a somewhat broader but still relatively narrow peak efficiency operating speed.

Although having a slightly lower efficiency than that of a purely mechanical transmission, due to the addition of hydraulic losses, hydromechanical transmissions have been thought desirable for over the road vehicular applications, due to the possibility of operating the prime mover or vehicle engine at a relatively constant speed near its most efficient speed, and have been thought desirable in off-road vehicular applications, since the continuous variability of the hydromechanical transmission provides smooth over-the-ground motion. This characteristic is desirable in such applications as heavy dump trucks, which often operate in soft soil, where an interruption in torque may cause the vehicle to sink into the surface, and in road graders, where an interruption in torque may provide an uneven road bed, and in farm implements, where uneven torque may cause the breakage of agricultural implements.

However, while hydromechanical transmissions have been successfully used in the past, they have been relatively intolerant of wide variations in input speed, being two or three-mode transmissions. These transmissions utilized as many as four gear sets to provide three modes of operation and did not provide an overdrive range. Further, such transmissions were not lockable at a direct drive ratio, to provide the efficiency of a conventional transmission, or could not be operated near this point without causing substantial changes in torque, such as the jolt provided by certain recent automotive transmissions. Such an operating characteristic is most unsuitable when operating heavy equipment, particularly when operated under conditions of uncertain traction or in soil of unpredictable characteristics.

Examples of prior art hydromechanical transmissions are disclosed in U.S. Pat. Nos. 3,714,845; 3,979,972; 4,306,467; and 4,341,131.

SUMMARY OF THE INVENTION

The present invention provides a continuously variable transmission for stationary or vehicle use, to convert a fixed or variable input speed to a fixed or variable output speed over a broad operating range. A hydrostatic reverse range is provided. There are no reverse gears, clutches or counter shafts for reduced weight and heightened efficiency. High torque multiplication is provided by compounding planetary gear sets. This provides a compact and efficient transmission.

The rotating components rotate at relatively low velocities which results in low stirring, bearing and friction losses, yielding greater efficiency. There are no abrupt speed changes of gears or clutches at shift points, so that there are low torque changes upon shifting, with resulting smooth shifting. There is one clutch per operating mode, which simplifies the automatic controls which may be used. The transmission of the invention features fully synchronized shifting which both provides smooth shifts and allows the use of tooth-type clutches which are more efficient and lower in weight than friction disk clutches, and also allows the use of fewer friction disks if such a clutch is used, since there is less wear. The compounding of planetary gear sets yields low hydraulic pressure and low hydraulic horsepower, increasing efficiency. Both disclosed embodiments of a hydrostatic transmission utilize two fixed clutches, used as brakes, which is advantageous in that the actuating provisions are simplified over those of rotating clutches. The two rotating clutches which are used are close to an end of the transmission, so that connections may be made through holes drilled in shafts and rotating couplings which are short in length, thus simplifying manufacture.

At three points over the operating range of both embodiments of the hydrostatic transmission, most of the gears turn as a group. All the gears turn as a group at one operating point, which is advantageous, both in reducing stirring losses and also in locking the transmission in direct drive without jerking. Also, the non-engaged clutches have low relative speed, which reduces viscous drag losses. The transmissions disclosed are shifted at pressure extremes, which is advantageous in that there are low changes in pressure during shifting, so that shifting is smooth. Hydraulic pressure is arranged to decrease as speed increases, so that efficiency increases as speed increases. Also, a transmission according to the invention has both hydraulic and mechanical power takeoff capacity, using standard power takeoff boxes. These may engage the output of a hydraulic unit with the hydraulic portion of the transmission engaged, or may engage transmission input gearing or output gearing, with the hydraulic power path disengaged.

The invention provides a four range hydrostatic transmission in which a first range includes a reverse range, and the fourth range is an overdrive range. A first embodiment utilizes four planetary gear sets, which is advantageous in that there are fewer gear sets per range than previous transmissions of fewer ranges, yielding increased efficiencies and lower weight. A second embodiment of the invention utilizes five planetary gear sets, yielding higher low speed efficiency than previous transmissions of fewer ranges, while providing generally increased efficiency and lower weight.

The above, as well as other advantages of the present invention, will become readily apparent to one skilled in the art from reading the following detailed description of the invention in conjunction with the attached drawings.

DESCRIPTION OF THE PREFERRED EMBODIMENTS

It may be initially noted that both embodiments of the invention are shown in schematic form, and are described as if automatically controlled. Such automatic controls are well known and easily implemented. For instance, the automatic control of a transmission may require information regarding the input shaft speed, the output shaft speed, and the load on the associated prime mover, such as an internal combustion engine. The information about the vehicle speed or output shaft speed is not required, but may be convenient. To obtain such information about the input shaft speed, a "front pump" is driven by the input shaft and produces a proportional pressure. If provided a "rear pump" also provides a proportional pressure, and engine load information is either derived by a mechanical linkage to a throttle plate or injection control lever, or by a piston positioned by the vacuum found in the intake manifold of the engine. The portion of a transmission which receives this load information is usually called a "modulator valve". The resulting pressures are valved by, for example, pilot-operated valves set to open at differing pressures, each connected to a clutch, brake or shifting fork, in order to control swash plate angle in a hydro-mechanical transmission, and the hydraulic analog of a electronic flip-flop is used so that an increasing signal pressure drives the swash plate first in one direction, and then in the opposite direction. And, as will appear below, an additional clutch or brake may be advantageously used in either of the two embodiments of the invention to provide a mechanical overdrive range, which may be controlled by appropriate hydraulic logic.

Figure 1:
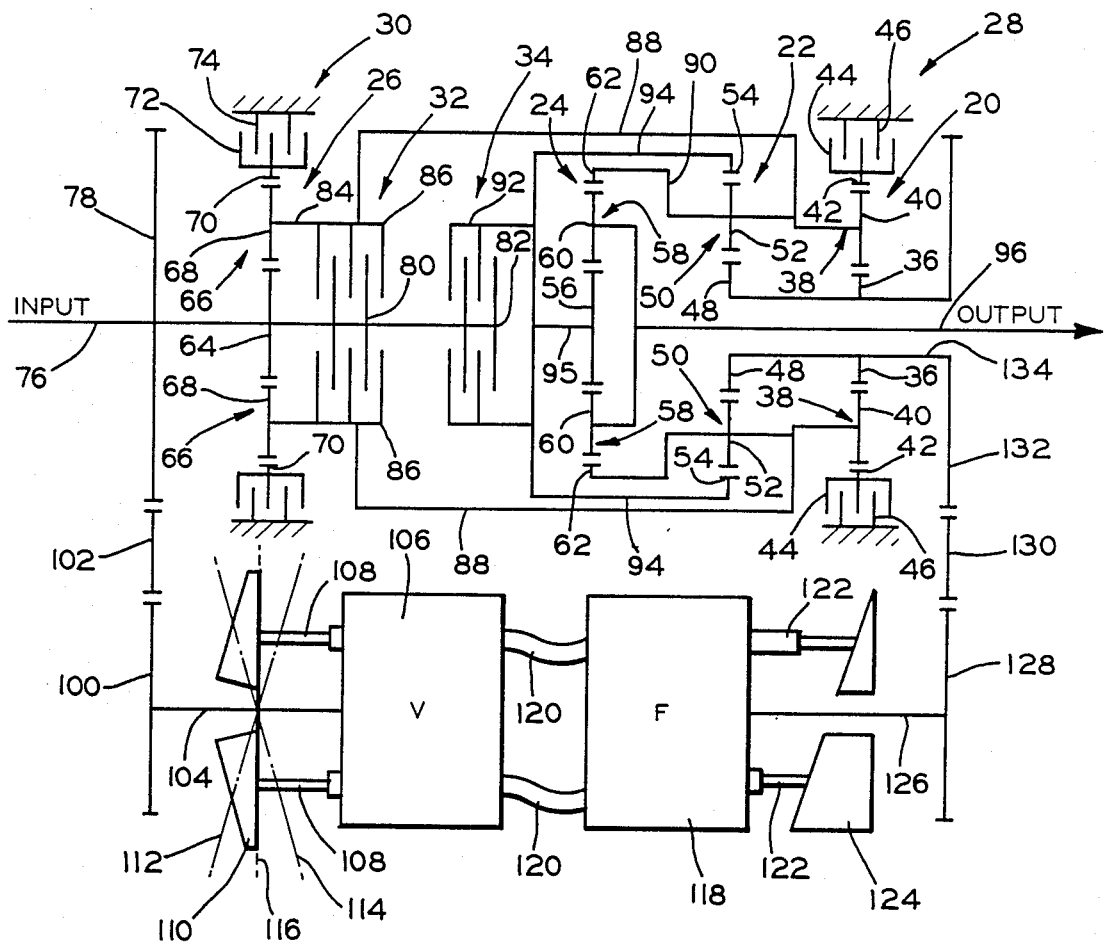
FIG. 1 is a schematic diagram of a first embodiment of a four-range transmission according to the invention, utilizing four interconnected planetary gear sets.

Referring first to FIG. 1, the first preferred embodiment of the invention utilizes four planetary gear sets identified as a first planetary gear set 20, a second planetary gear set 22, a third planetary gear set 24 and a fourth planetary gear set 26. Also shown are four clutches or brakes, identified as a first clutch 28, a second clutch 30, a third clutch 32 and a fourth clutch 34.

Figure 3:
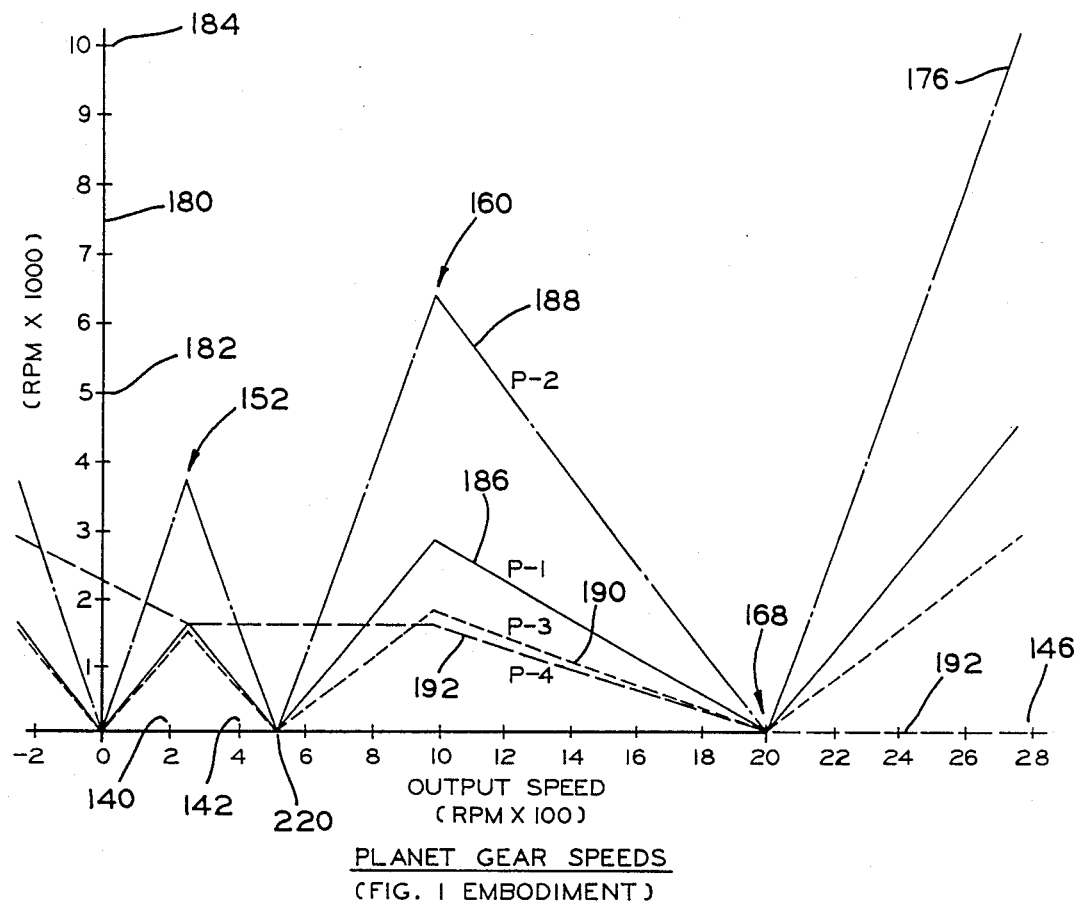
Figure 4:
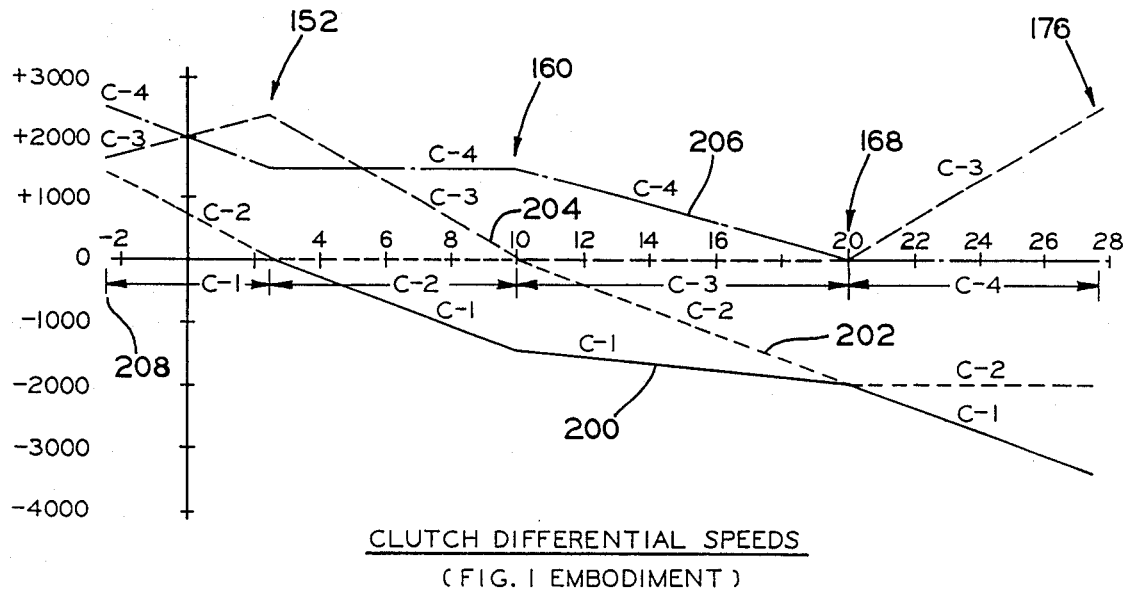
Figure 5:
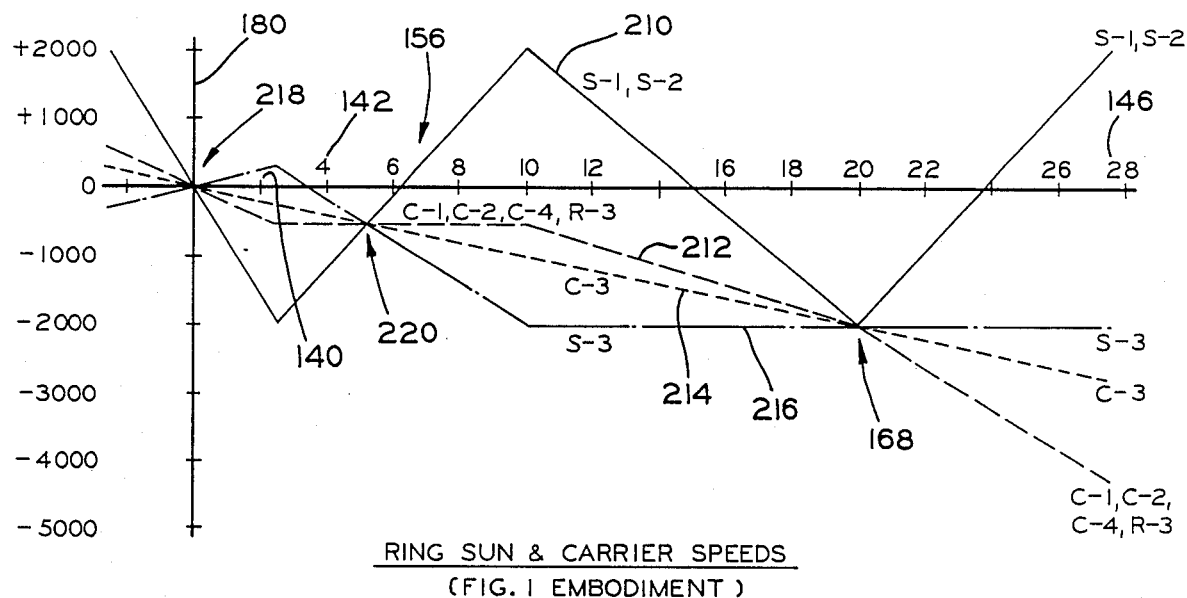

These various components are designated with abbreviations in the performance diagram shown in FIGS. 3–5. For instance, the sun, ring and carrier assemblies of the first planetary gear set 20 are identified respectively as S-1, R-1 and C-1, with the planet gears carried by the carrier of the planetary gear set 20 identified as P-1. Corresponding subject numbers are used with similar abbreviations for the second, third and fourth planetary gear sets 22, 24 and 26.

The first planetary gear set 20 includes a first sun gear 36 and a first planet carrier 38. The carrier 38 carries a plurality of planet gears 40 which engage both the sun gear 36 and a ring gear 42. The ring gear 42 is affixed to a first rotating portion 44 of the first clutch 28. The second portion 46 of the first clutch 28 is non-rotating, so that the first clutch 28 acts as a brake. As previously stated, this is advantageous for simplicity and convenience in controlling the first clutch 28.

Likewise, the second planetary gears 22 include a second sun gear 48 and a second planet carrier 50. The carrier 50 supports a plurality of second planet gears 52 which interconnect the second sun gear 48 and a second ring gear 54.

Likewise, the third planetary gear set 24 includes a third sun gear 56 and a third planet carrier 58. The carrier 58 supports a plurality of third planet gears 60 which interconnect the third sun gear 56 and a third ring gear 62.

Finally, the fourth planetary gear set 26 includes a fourth sun gear 64 and a fourth planetary gear carrier 66 which carries a plurality of planet gears 68. The gears 68 interconnect the fourth sun gear 64 and a fourth ring gear 70, which is fixed to a first rotating part 72 of the second clutch 30. A second part 74 of the second clutch 30 is fixed so that the second clutch 30 acts as a brake. As stated, the positioning of the second clutch 30 simplifies the actuating connection to the second clutch 30 since, as illustrated, the clutch 30 is close to an end of the transmission shown in FIG. 1.

An input shaft 76 turns an input gear 78, and is connected to the fourth sun gear 64, to a first rotating part 80 of the third clutch 32, and to a first rotating part 82 of the fourth clutch 34. The fourth planet carrier 66 is connected, by a tubular member 84, to a second rotating part 86 of the third clutch 32, and by a member 88 to the first planet carrier 38. The first planet carrier is in turn affixed to the third ring gear 62 by a member 90.

It may be noted that all shafting and interconnecting members are tubular shaped. Obviously, when one tubular shape encloses other functional parts, appropriate modifications are made to allow access to the internal parts. These modifications may extend as far as modifying a tubular member until it becomes two or more interconnecting struts.

As further illustrated in FIG. 1, the second rotating part 92 of the fourth clutch 34 is connected to the second ring gear 54 by an interconnecting member 94, and is also connected to the third sun gear 56 by an interconnecting member 95. Also, as illustrated, the third planet carrier 58 is connected to an output shaft 96.

The input gear 78 is connected to a hydraulic section input gear 100 through an intermediate or idler gear 102. The gear 100 is connected to and rotates an input shaft 104 of a variable displacement hydraulic unit 106 shown as including a plurality of pistons 108. These pistons 108 are acted upon by a swash plate 110 mounted around the input shaft 104. The variable displacement hydraulic unit 106 may act either as a pump or as a motor. In addition, the swash plate 110 is moveable from a first extreme position 112 to a second extreme position 114 through an intermediate centered or neutral position 116. Preferably, the swash plate 110 is non-rotating, while the variable displacement hydraulic unit 106 rotates with the shaft 104. The variable displacement unit 106 is shown connected to a fixed displacement hydraulic unit 118 through hydraulic lines 120. Preferably, the hydraulic lines 120 are implemented in the form of a concentric manifold, and the fixed displacement hydraulic unit 118 and the variable displacement hydraulic unit 106 are mounted in a common enclosure. The fixed displacement hydraulic unit 118 is shown as including a plurality of hydraulic pistons 122 actuated by or acting on a fixed swash plate 124. The rotation of the fixed displacement hydraulic unit 118 rotates a hydraulic section output shaft 126, coupled to a hydraulic section output gear 128. The hydraulic section output gear 128 rotates an intermediate or idler gear 130 to turn a gear 132. The gear 132 is mounted on a shaft 134, which is concentric with the output shaft 96 and is connected to the first sun gear 36 and the second sun gear 48.

As should be apparent from the foregoing, the mechanical section of a hydromechanical transmission provides a mechanical gear ratio, while the hydraulic section provides a rotational speed that adds or subtracts to that speed due to the mechanical gear ratio, through a differential mechanism. In the embodiment shown in FIG. 1, the hydraulic section input to this differential mechanism is to the first and second sun gears 36 and 48, while the available mechanical inputs are, in combination, the first and second planet carriers 38 and 52 and the third ring gear 62 or, the third sun gear 56. The overall output through the shaft 96 is from the third carrier 58. As should also be apparent, the planetary gear sets 20, 22, and 24 act both as a differential mechanism and as a compounded planetary gear set, with both functions being combined in the same gear sets.

The four clutches 28, 30, 32 and 34 are sequentially operated to provide the first, second, third and fourth transmission ranges. As will become apparent, the first range with the first clutch 28 engaged is either a reverse gear or a low gear ratio, depending on the position of the swash plate 110. The second range, with the second clutch 30 energized, is in the nature of a conventional second gear range, and the third range, with the third clutch 32 engaged, is in the nature of a conventional third gear range. With the fourth clutch 34 engaged, the output of the transmission is of greater speed than the input, so that the fourth range is an overdrive range.

Figure 2:
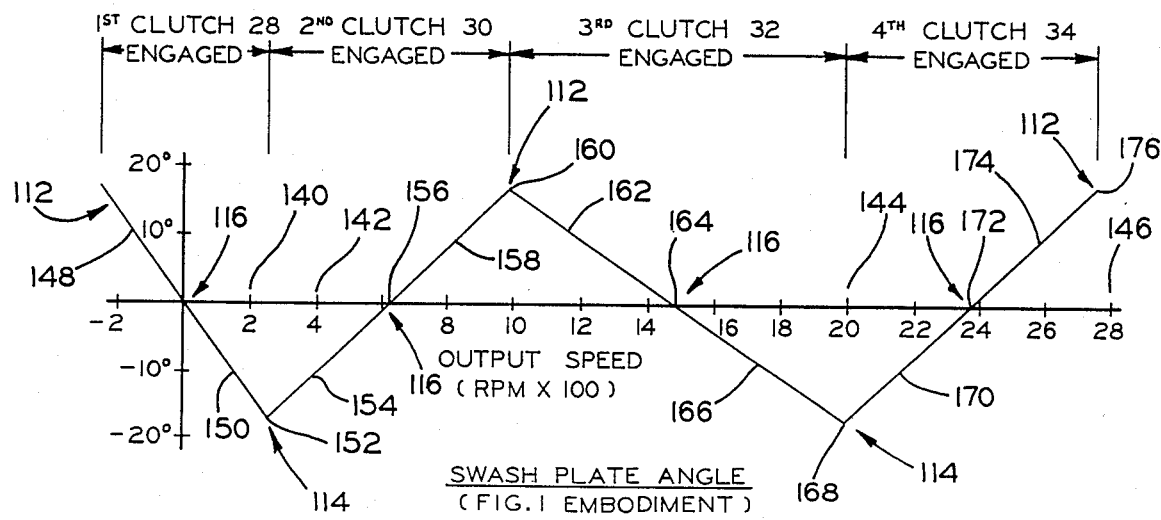
FIGS. 2–6 show certain operating characteristics of the embodiment shown in FIG. 1, assuming an input shaft speed of two thousand rpm, with FIG. 2 showing swash plate angle versus output shaft speed and gear range, FIG. 3 showing planet gear rotational speeds versus output shaft speed, FIG. 4 showing clutch differential speeds, FIG. 5 showing the speeds of ring gears, sun gears and planet gear carriers versus output shaft speed, and FIG. 6 showing general performance characteristics versus output speed.

The positioning of the swash plate 110 with respect to output shaft rpm with an input shaft speed of two thousand rpm is shown in FIG. 2. It may be noted that the horizontal axis graduations are the same in all performance figures, with the numbers representing output shaft rpm divided by one hundred, so that a point 140 represents two hundred rpm, a point 142 represents four hundred rpm, a point 144 represents two thousand rpm, and a point 146 represents two thousand eight hundred rpm.

As will become apparent, the reverse gear range is defined by a curve segment 148 lying between swash plate displacements of the first extreme position 112 and the centered position 116 with the first clutch 28 engaged. In this operating condition, the variable displacement hydraulic unit 106 act as a pump, while the fixed displacement hydraulic unit 118 acts as a motor. The low or first gear range is defined by the first clutch 28 being engaged and the swash plate 110 being disposed between the centered position 116 and the second extreme position 114. This segment, defined by a curve segment 150, is produced by causing the variable hydraulic unit 106 to act as a pump and the fixed displacement hydraulic unit 108 to act as a motor. The terminal point of the curve segment 150 is a first-second shift point 152, characterized by an output shaft rpm of two hundred fifty-nine rpm, at which time the second clutch 30 is engaged and the first clutch 28 is disengaged. As shown by a curve segment 154 as the swash plate 110 is moved from the position 114 to the position 116, the variable hydraulic unit 106 acts as a motor, the fixed displacement hydraulic unit 118 acts as a pump, and the output shaft speed increases to six hundred thirty-four rpm at a point 156. As the swash plate 110 is moved from the centered position 116 to the first extreme position 112, as shown in a curve segment 158, the variable displacement hydraulic unit 106 acts as a pump, the fixed displacement hydraulic unit 118 acts as a motor, and the output shaft rpm increases to nine hundred sixty-six rpm, at the second-third shift point 160, where the third clutch 32 is engaged and the second clutch 30 is disengaged.

During curve segment 162, the swash plate is moved back towards the centered position, producing an output shaft speed of one thousand five hundred and twenty rpm at an operating point 164. As the swash plate movement continues, the variable hydraulic unit 106 acts as a pump, the fixed displacement hydraulic unit 118 acts as a motor and, as shown by curve segment 166, the output shaft rpm increases to two thousand rpm at an operating point 168, which is the one-to-one ratio point and also the third-overdrive shift point. At this point, the fourth clutch 34 may be engaged and the third clutch 32 may be disengaged, producing the operating conditions shown by a curve segment 170, during which the fixed hydraulic unit 118 acts as a pump and the variable displacement hydraulic unit 106 acts as a motor, and, as the swash plate 110 is moved back towards the centered position 116, the output rpm increases to two thousand three hundred and seventy-four rpm at an operating point 172. Further movement of the swash plate 110 produces curve segment 174, during which the variable displacement unit 106 acts as a pump and the fixed displacement hydraulic unit 118 acts as a motor and output rpm increases to two thousand seven hundred forty-eight rpm at an operating point 176, with an input shaft speed of two thousand rpm.

It may be specifically noted that, when the swash plate 110 is in the centered position 116, there is no hydraulic flow between the variable displacement hydraulic unit 106 and the fixed displacement hydraulic unit 118. This is significant from two standpoints. First, there are no hydraulic losses at this point. Secondly, if the fixed displacement hydraulic unit 118 and the variable displacement hydraulic unit 106 were disabled at this point, such as by applying a brake to the shaft 126 or a clutch to disengaged the shaft 104, the transmission of the invention would operate as a purely mechanical transmission, with the slightly-increased efficiency of a purely mechanical transmission.

Referring again to FIG. 1, it may be seen that when the first clutch 28 is engaged, the first ring gear 42 is fixed in position, and power applied to the input shaft 76 is applied to first, second and third gear sets 20, 22 and 24 producing a deep reduction and resulting high torque. When the first clutch 28 is disengaged and the second clutch 30 is engaged, the fourth gear set 26 provides reduction gearing before the rotation applied to the input shaft 76 is applied to the first, second and third gear sets 20, 22, and 24. With the third clutch 32 engaged, and all other clutches disengaged, the fourth gear set 26 is effectively bypassed. In the fourth operating mode, with the fourth clutch 34 alone energized, the input shaft power is applied to the third sun gear 56 and to the second ring gear 54, producing an overdrive gear ratio.

In FIG. 3, which represents the rotational speed of sets of planet gears, the vertical axis 180 has units of thousands of revolutions per minute, with point 182 representing five thousand rpm and point 184 representing ten thousand rpm. A characteristic curve 186 represents the rotational speeds of the first planet gears 40. A curve 188 represents the rotational speed of the second planet gears 52. A curve 190 represents the rotational speeds of the third planet gears 60, and a curve 192 represents the rotational speed of the fourth planet gears 68. As can be seen from this figure, all planet gears except the fourth planet gears 68 are stopped when the input shaft speed is two thousand rpm and the output speed is zero rpm. Also, at the operating point 168, which is the one-to-one ratio operating point and the third-overdrive shift point, the rotational speeds of all the planet gears are zero rpm. It may be noted that, under these test conditions, the speed of the second planet gears 52 reaches a speed in excess of ten thousand rpm at a point 176. While this may appear to be a high rotational speed, commercially-available prior art transmissions produce planet gear speeds on the order of sixteen thousand rpm.

Referring now to FIG. 4, the differential speeds of the four clutches used in the first embodiment of the invention are illustrated. As can be seen, the separate parts of each of the four clutches utilized have rather low differential speeds, which approach zero at the time they are engaged or disengaged. In FIG. 4, a curve 200 indicates the differential speed of the first clutch 28. Likewise, curves 202, 204 and 206 indicate the respective differential speeds of the second, third and fourth clutches 30, 32 and 34. As indicated, first clutch 28 is engaged, with a zero differential speed, from the maximum reverse speed point 208 to the first-second shift point 152, where it is disengaged and then gradually develops a high negative differential rotational speed as output shaft speed increases. As indicated by the curve 202, the separate parts of the second clutch 30 gradually decrease in relative speed as the output shaft speed increases, and reach zero rpm at the first-second shift point 152, where they are then engaged. After disengagement at point 160, the two parts of the second clutch 30 develop a high negative rotational speed which increases with the output shaft speed. As shown by the curve 204, the differential speed of the third clutch 32 reaches a positive maximum at the first-second shift point 152, then reverses and reaches a zero speed at the second-third shift point 160, where it is engaged. After disengagement at the third-overdrive shift point 168, the speed of the third clutch 32 again rises with increasing output shaft speed. As indicated by the curve 206, the differential speed of the fourth clutch 34 is at its highest at the point 208, and decreases towards zero, becoming zero at the third-overdrive shift point 168, where it is engaged.

As will be apparent, the four clutches involved are operated in a reverse sequence as the output shaft speed decreases, and as will appear more fully below, if the third clutch 32 and the fourth clutch 34 are simultaneously engaged, the transmission operates as a conventional mechanical transmission in direct drive.

Turning now to FIG. 5, it may be seen that the rotational speeds of the various ring gears, sun gears and carriers are such that they move as a unit, with no relative rotation, at three operating points over the operating range of the transmission. In FIG. 5, a curve 210 corresponds to the rotational speeds of the first and second sun gears 36 and 48 over the operating range of the transmission. In like fashion, a curve 212 shows the operating speeds of the first, second, and fourth carriers, 38, 50 and 66, and of the third ring gear 62. A curve 214 shows the rotational speed of the third planet carrier 58, and a curve 216 shows the rotational speed of the third sun gear 56. As illustrated, the components indicated by the curves 210, 212, 214 and 216 are stopped as a unit at a point 218 where the speed of the output shaft 96 is zero. These components are rotating with respect to the housing of the transmission but stopped with respect to each other at an operating speed adjacent but below the operating point 156, and again at the third-overdrive shift point 168.

Thus, from FIG. 5 and FIG. 3, two concepts will be apparent. First, that the rotational speeds of the gears are relatively low and approach zero for most of the gears at the two operating points a vehicle might spend the majority of its operating time if an on-highway vehicle. Secondly, the speeds of the gears are low at the two points which represent the majority of the operating conditions for an off-highway vehicle. This should be apparent to one skilled in the art, since a conventional manual-transmission highway truck spends the majority of time either at idle or in third gear, while an off-highway truck spends the majority of time in second gear, and a point 220 is chosen with this consideration in mind.

So, if the clutches 32 and 34 are engaged at the operating point 168, and above, the differential clutch speeds shown as the curves 202 and 206 of FIG. 4 for these clutches will be zero. This forces the first and second planet gear carriers 38 and 50, the third ring gear 62, the third sun gear 56, the fourth sun gear 64, and the fourth planet gear carrier 66 to rotate at identical speeds, which will be that shown by the curve 214. This speed is also the speed of the output shaft 96, since the shaft 96 is connected to the third planet carrier 58, and the third ring gear 62 and the third sun gear 56 move as a unit.

It will also now be apparent that stopping the swash plate 110 at its centered position at the point 172, between the curve segments 170 and 174 of FIG. 2, or applying a brake operably connected to the hydraulic section output shaft 126 will remove any contribution of the hydraulic portion of the transmission, allowing it to operate with the efficiency of a purely mechanical transmission at an overdrive gear ratio, which, in the embodiment illustrated, is about 1 to 1.2.

Figure 6:
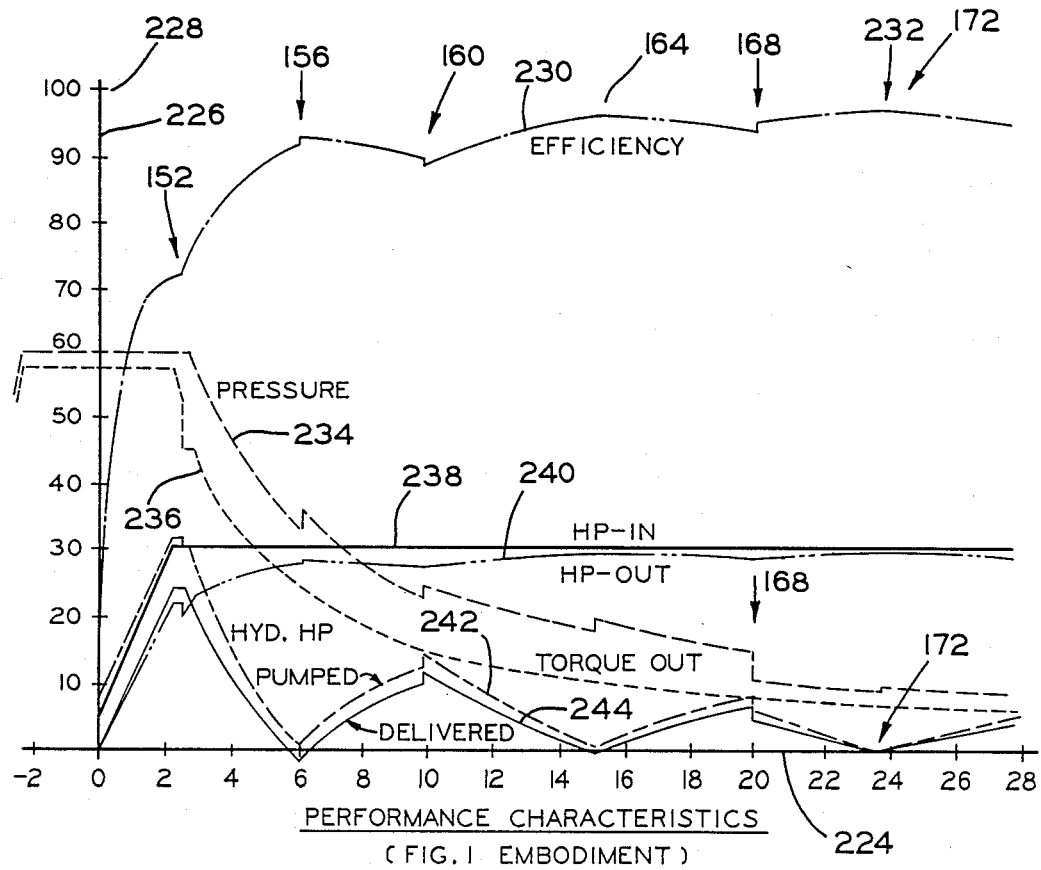

Turning now to FIG. 6, there are shown various performance curves of the transmission shown in FIG. 1. It may be noted at this point that, for example, the transmission of FIG. 1 has greater high speed efficiency, but lesser low speed efficiency, than the transmission of FIG. 7, to be described below.

In FIG. 6, a horizontal axis 224 has graduations in hundreds of revolutions per minute, while a vertical axis 226 has graduations from zero to one hundred in units of ten, with a full scale value 228 readable as one hundred percent of efficiency, ten thousand pounds per square inch of pressure, one thousand horsepower, ten thousand foot-pounds of torque, with the respective data curves based on an input shaft speed of two thousand rpm and a constant torque-limited input horsepower. Obviously, these parameters would not be constant in a vehicle application, and would be different, but possibly constant, in a stationary application of a transmission according to the invention. It may also be noted that the stepwise transitions in these curves are due to the use of experimental conditions or calculations carried on past actual transition points, so that a normal amount of nonrepeatability of measurement produced amptitude mismatches at transition points, resulting in apparently non-continuous curves in some instances. The resulting power transmission is, however, smooth and continuous in nature.

In FIG. 6, a curve 230 indicates the overall efficiency and shows a maximum approaching 98% at a point 232, in the fourth operating mode or overdrive range of the transmission of FIG. 1. A curve 234 indicates the operating pressure and shows its decrease with speed. A curve 236 indicates the output torque, as delivered by the shaft 96. Curves 238 and 240 indicate the relationship between the horsepower as applied to the input shaft 76 and as available from output shaft 96. Curves 242 and 244 indicate the hydraulic horsepower, as pumped, and as delivered. The difference between these the curves is a measure of the hydraulic losses. It may be noted that curves 242 and 244 seem to coincide at the operating point 172, which is the midpoint of the overdrive range, producing the high efficiency of the point 232. Due to this, the hydraulic part of the transmission may be inactivated at this point without incurring any torque variation or jerkiness.

Figure 7:
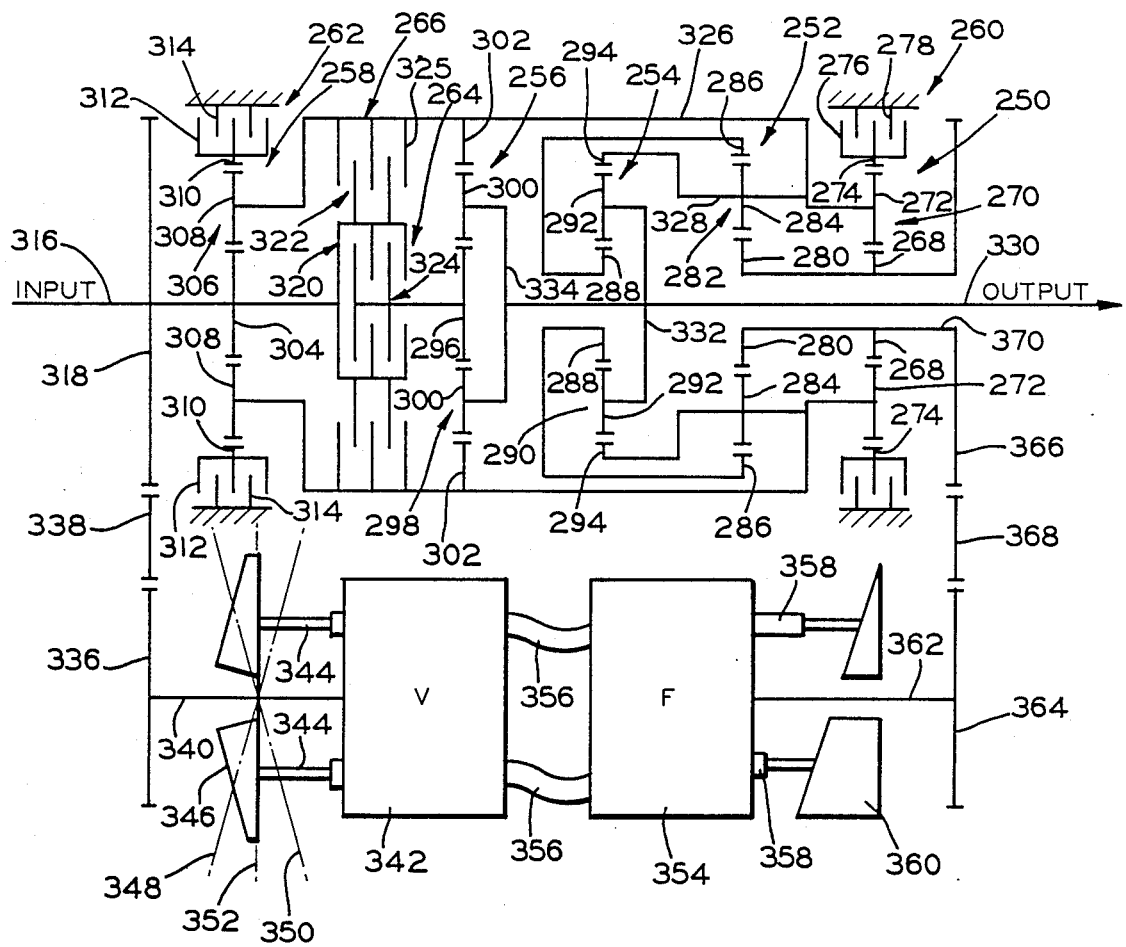
FIG. 7 is a symbolic illustration of a second embodiment of a four-range transmission according to the invention, utilizing five interconnected planetary gear sets.

Turning now to FIG. 7, there is shown a second embodiment of the invention, which operates in a manner similar to the operation of the first embodiment of the invention shown in FIGS. 1 through 6, but utilizing a fifth planetary gear set and a rearrangement of parts in common, to produce a hydromechanical transmission of greater low speed efficiency than the embodiment of FIG. 1, with consequent minor penalties in weight, complexity, and high speed efficiency.

The transmission of FIG. 7 includes first, second, third, fourth and fifth planetary gearsets 250, 252, 254, 256 and 258 and first, second, third and fourth clutches 260, 262, 264 and 266.

The first planetary gearset 250 includes a first sun gear 268 and a first planet gear carrier 270. The carrier 270 supports a plurality of rotatably mounted planet gears 272 and a first ring gear 274, which is affixed to a first rotating part 276 of the first clutch 260. The second part 278 of the clutch 260 is fixed, so that the first clutch 260 acts as a brake and provides the construction advantages described above.

Similarly, the second planetary gearset 252 includes a second sun gear 280, a second planet gear carrier 282 which carries a plurality of second planet gears 284, and a second ring gear 286. The third planetary gearset 254 includes a third sun gear 288, a third planet gear carrier 290 carrying a plurality of planet gears 292, and a third ring gear 294. The fourth planetary gearset 256 includes a fourth sun gear 296, a fourth gear carrier 298 carrying a plurality of planet gears 300, and a fourth ring gear 302. The fifth planetary gearset 248 includes a fifth sun gear 304, a fifth planet gear carrier 306 carrying a plurality of fifth planet gears 308, and a fifth ring gear 310. The fifth ring gear 310 is affixed to a first rotating part 312 of the second clutch 262. A second part 314 of the second clutch 262 is fixed so that the second clutch 262 functions as a brake, with advantages in ease of manufacturing of the invention.

An input shaft 316 is connected to input gear 318 and to a first rotating part 320 of the third clutch 264 and also to a first rotating part 322 of the fourth clutch 266. The second rotating part 324 of the third clutch 264 is connected to a fourth sun gear 296, and the second rotating part 325 of the fourth clutch 266 is connected to a rotating member 326. The member 326 interconnects the fifth planet carrier 306, the fourth ring gear 302, and the first planet carrier 270 which in turn is connected by a member 328 to the second planet carrier 282 and to the third ring gear 294. An output shaft 330 is connected to the third planet gear carrier 290 and to the fourth planet gear carrier 298 by respective members 332 and 334.

The input gear 318 is connected to a hydraulic section input gear 336 through an intermediate or idler gear 338, which is connected to an input shaft 340 of a variable displacement hydraulic unit 342. The variable displacement hydraulic unit 342 includes a plurality of pistons 344, which bear against a swash plate 346. The swash plate 346 is shown variable in angular position from a first extreme position 348 to a second extreme position 350 through an intermediate or neutral position 352. The variable displacement hydraulic unit 342 is hydraulically connected to a fixed displacement hydraulic unit 354 by means illustrated as a set of hydraulic lines 356, but which are preferably implemented as a concentric rotating manifold between the hydraulic units 342 and 354. The fixed displacement hydraulic unit 354 includes a plurality of pistons 358 which bear against a fixed swash plate 360, and an output shaft 362 connected to a hydraulic section output gear 364. The gear 364 is coupled to a differential input gear 366 through an intermediate or idler gear 368.

As before, the variable displacement hydraulic unit 342 and the fixed displacement hydraulic unit 356 are preferably rotatably mounted in a separate housing (not shown). The differential input gear 366 is connected to the first sun gear 268 and to the second sun gear 280 by a member 370 which is concentric with the output shaft 330.

As with the transmission of FIG. 1, the transmission of FIG. 7 is operated by sequentially operating the first through the fourth clutches 260, 262, 264 and 266 while moving the swash plate 346 back and forth between the first and the second extreme positions 348 and 350 to produce the four operating ranges, during which the hydraulic section including variable displacement hydraulic unit 342 and fixed displacement hydraulic unit 354 acts to alternately add to, and subtract from, the output speed provided by the actuated planetary gearsets. To accomplish this, the variable displacement hydraulic unit 342 and the fixed displacement hydraulic unit 354 alternate roles as a hydraulic pump and as a hydraulic motor.

Figure 8:
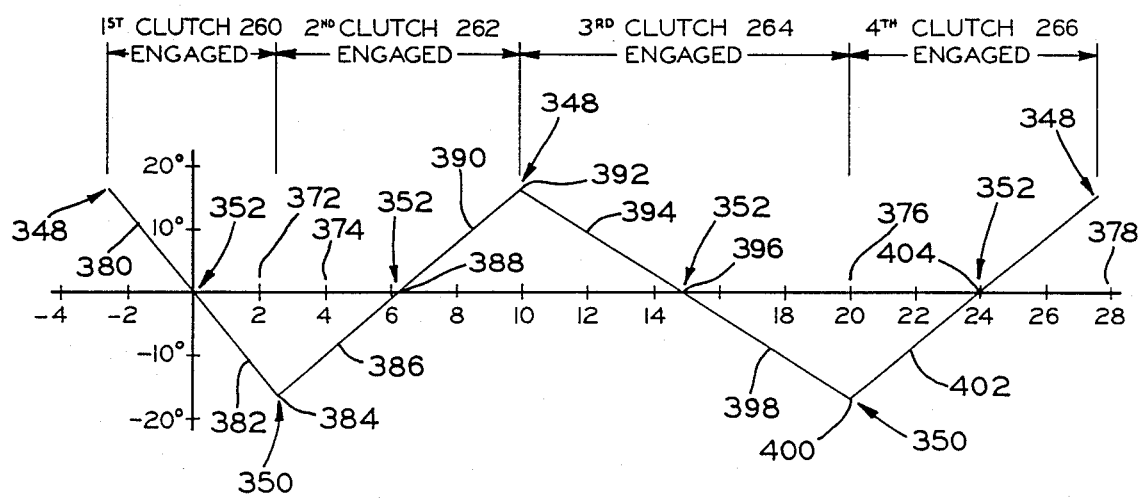
FIGS. 8–12 show certain operating characteristics of the second embodiment of a transmission according to the invention shown in FIG. 7, at an assumed input shaft speed of two thousand rpm, with FIG. 8 showing swash plate angle versus output shaft speed and gear range, FIG. 9 showing the rotational speeds of planet gears versus output shaft rotational speed, FIG. 10 showing clutch differential speeds, FIG. 11 showing the rotational speeds of ring gears, sun gears and planet gear carriers versus output shaft speed, and FIG. 12 showing general performance characteristics versus output shaft speed.

Referring now to FIG. 8, there is shown a curve relating the position of the swash plate 346 with the speed of the output shaft 330. As in corresponding FIG. 2, the horizontal axis has a point 372 representing two hundred rpm, a point 374 representing four hundred rpm, a point 376 representing two thousand rpm, and a point 378 representing two thousand eight hundred rpm.

The curve segment 380 represents a reverse gear range, with the first clutch 260 engaged, the swash plate 346 disposed between the first extreme position 348 and the neutral position 352, and with the variable displacement hydraulic unit 342 acting as a pump and the fixed displacement hydraulic unit 354 acting as a motor. The curve segment 382 represents a first gear range, with the first clutch 260 engaged and the swash plate 346 disposed between the neutral position 352 and the second extreme position 350, with the variable displacement hydraulic unit 342 acting as a pump and the fixed displacement hydraulic unit 354 acting as a motor. The curve 382 ends at a first-second shift point 384 representing an output speed of two hundred fifty-nine rpm. The curve segment 386 represents the lower portion of a second gear range, with the second clutch 262 engaged, the swash plate 346 disposed between second extreme position 350 and the neutral position 352, and with the variable displacement hydraulic unit 342 acting as motor, and the fixed displacement hydraulic unit 354 acting as a pump. In this range, the neutral position 352 represents an operating point 388, corresponding to an output shaft speed of six hundred thirty-four rpm.

The curve segment 390 represents an upper part of a second gear range, which ends at a second-third shift point 392 representing an output shaft speed of nine hundred sixty-six rpm, and occurs when the swash plate 346 is disposed between the neutral position 352 and the first extreme position 348. At this point, the variable displacement hydraulic unit 342 acts as a pump, and the fixed displacement hydraulic unit 354 acts as a motor.

The curve segment 394 represents a lower portion of a third gear range, and extends from the second-third shift point 392 to an operating point 396, representing one thousand five hundred twenty rpm. It is produced when the third clutch 266 is engaged, and the swash plate 346 is disposed between the first extreme position 348 and the neutral position 352, at which time the variable displacement hydraulic unit 342 acts as a motor and the fixed displacement hydraulic unit 354 acts as a pump.

The curve segment 398 extends between the point 396 and a one-to-one ratio point and third-overdrive shift point 400, representing an output shaft speed of two thousand rpm, assuming as usual, an input shaft speed of two thousand rpm. During this time, the swash plate 346 is disposed between the neutral position 352 and the second extreme position 350, and the variable displacement hydraulic unit 342 acts as a pump and the fixed displacement hydraulic unit 354 acts as a motor.

The curve segment 402 extends between the third-overdrive shift point 400 and an operating point 404, representing an output shaft speed of two thousand three hundred and seventy-four rpm. The curve segment 402 occurs with the fourth clutch 266 engaged, the swash plate 346 disposed between the second extreme position 350 and the neutral position 352, with the variable displacement hydraulic unit 342 acting as a motor, and the fixed displacement hydraulic unit 354 acting as a pump.

The final curve segment 406 lies between the point 404 and a maximum speed point 408, representing two thousand seven hundred and forty-eight rpm, and occurs when the swash plate 346 is disposed between the neutral position 352 and the first extreme position 348 where the variable displacement hydraulic unit 342 acts as a pump and the fixed displacement hydraulic unit 354 acts as a motor.

Figure 9:
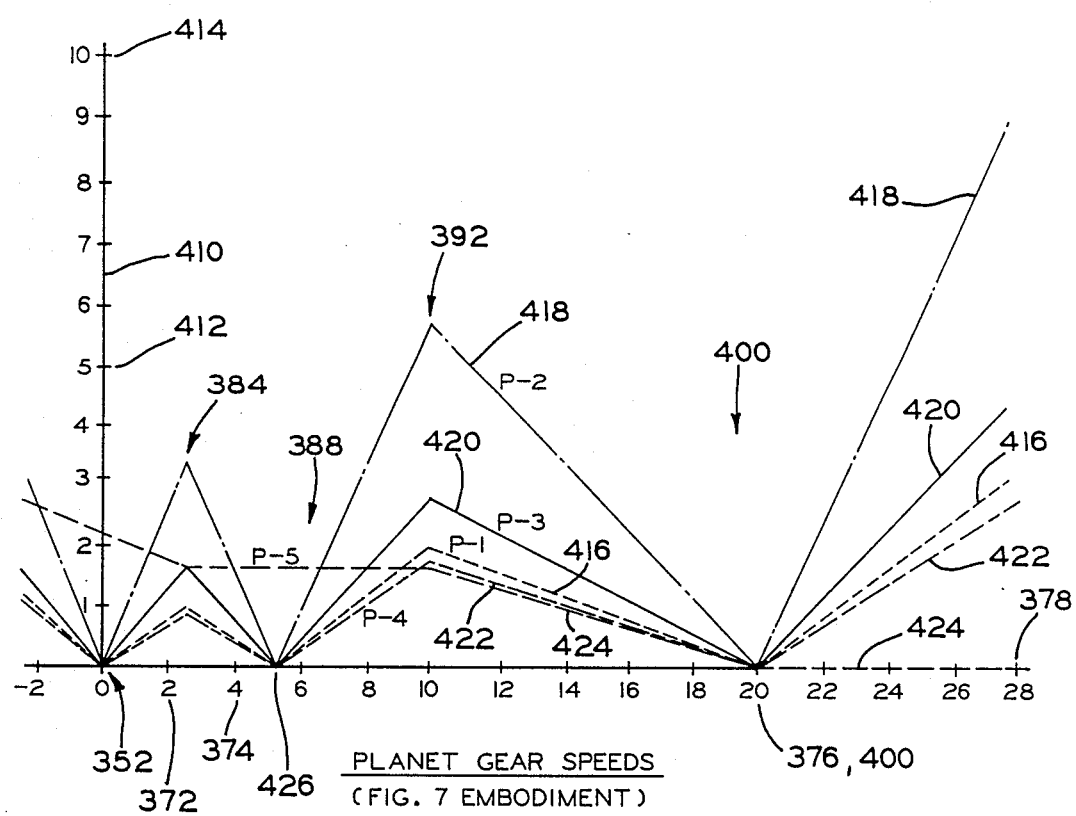

Turning now to FIG. 9, which is a representation of the planet gear speeds as a function of the output shaft speed, with an assumed input of two thousand rpm, it may be seen that a vertical axis 410 is calibrated in thousands of revolutions per minute with a point 412 representing five thousand rpm and a point 414 representing ten thousand rpm. A set of curves 416, 418, 420, 422 and 424 represent respectively the rotational speeds of the first, second, third, fourth and fifth planet gearsets 272, 284, 292, 300 and 308. As may be seen, all the planet gears other than the fifth planet gears 308 are nonrotating at the point 352 and at a point 426. Also, all the planetary gearsets are non-rotating at the one-to-one ratio and third-overdrive shift point 400. These characteristics produce low stirring losses and high efficiency at speeds where vehicles equipped with a transmission according to the invention spend a majority of operating time.

Figure 10:
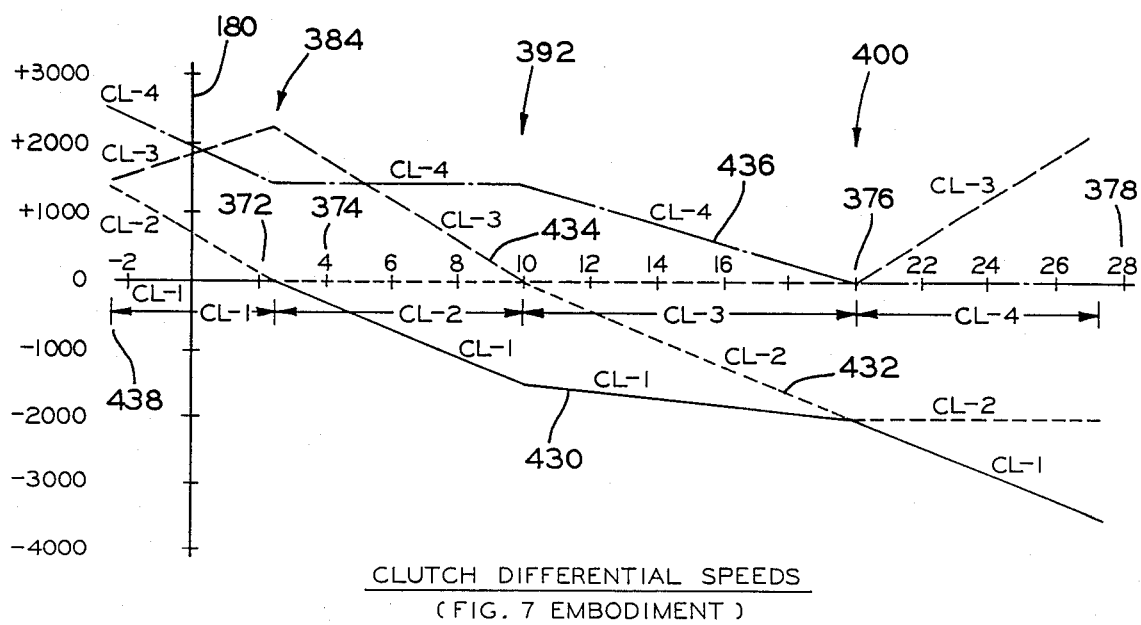

Turning now to FIG. 10, there are shown the differential speeds of the four clutches used in the second embodiment of the invention. It may be noted that the clutch differential speeds of FIGS. 4 and 10 are substantially identical, so that the same advantages apply. There is also a substantial similarity in construction from the location of non-braking clutches, as well as a close similarity in usefulness.

The curves 430, 432, 434, and 436 represent the respective rotational differential speeds of the first clutch 260, the second clutch 262, the third clutch 264, and the fourth clutch 266. As clearly shown, the first clutch 260 is engaged for output shaft speeds, again assuming a constant input shaft speed, from a maximum reverse speed point 438 to the first-second shift point 384 where, in normal accelerations, the differential speed of the second clutch 262 becomes zero, and it is engaged, while the first clutch 260 is disengaged.

The second clutch 262 then remains energized between the first-second shift point 384 and a second-third shift point 392. At this point, the differential speed of the third clutch 264 has become zero, so that it may be smoothly engaged, while the second clutch 262 is disengaged.

The third clutch 264 remains engaged between the second-third shift point 392 and the third-overdrive shift point 400. At this point, the differential speed of the fourth clutch 266 has become zero, so that it may be smoothly engaged. As with the embodiment of FIG. 1 if, at this time, the third clutch 264 remains engaged, the transmission shown becomes a one-to-one ratio connection between input and output shafts. Otherwise, at this point, the transmission of the invention enters an overdrive range upon the disengaging of the third clutch 264, during which only the fourth clutch 266 is engaged. As will be apparent from inspection of FIG. 10, the clutch differential speeds of the second embodiment of the invention are relatively low, contributing to the high efficiency of the invention.

Figure 11:
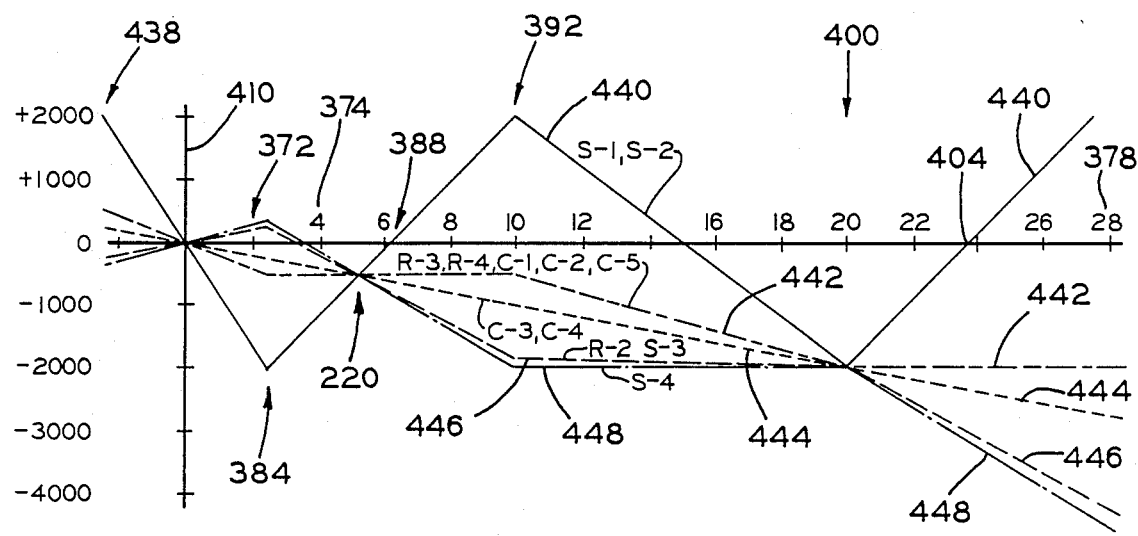

Turning now to FIG. 11, there is shown a charting of the rotational speeds of the various sun gears, the ring gears and the planet gear carriers versus the output shaft speed.

In FIG. 11, a curve 440 represents the rotational speeds of the first and second sun gears 268 and 280, which are proportional to the contribution of the hydraulic section of the transmission to the transmission output. The curve 442 represents the corresponding rotational speeds of the third and fourth ring gears 294 and 302, the first and second planet gear carriers 270 and 282, and the fifth planet gear carrier 306.

A curve 444 represents the rotational speeds of the third and fourth planet gear carriers 290 and 298, which is also the rotational speed of the output shaft 330. A curve 446 represents the rotational speeds of the second ring gear 286 and of the third sun gear 288, which are interconnected by the member 328. A curve 448 represents the rotational speed of the fourth sun gear 296 (which is "free wheeling" unless the third clutch 264 is engaged) between the second-third shift point 392 and the third-overdrive shift point 400. During this interval, the speed of the fourth sun gear 296 is constant, and equal to two thousand rpm, assuming a constant input speed of two thousand rpm applied to the input shaft 316.

As a brief inspection of FIG. 11 will reveal, the speeds of all rotating elements shown in this figure are identical at three points, so that they move as a unit at three output shaft speeds. These points at located (1) at idle, when the output shaft speed is zero where, for example, both off-road and on road vehicles often operate, at (2) a point 220 below the center of the "second gear" range, where off road vehicles often operate, and at (3) the upper end of the "third gear" range where on-road vehicles often operate. This reduces stirring losses at these points, thus reducing cooling requirements, oil degradation and maintenance requirements while increasing efficiency. Also, this allows the smooth locking of the transmission in direct drive at the third-overdrive shift point 400 by simultaneously engaging the third and fourth clutches 262 and 264, or in any other convenient manner. Also, with the curve 440 crossing through zero rpm at the point 404, the hydraulic part of the transmission may be disabled at this point, to eliminate the hydraulic pumping losses and give a fixed overdrive ratio from the engaged planetary gears, such as by retaining the swash plate 346 in the neutral position 352, applying a brake to shaft 362 or the gears 364, 366, and 368, or a clutch in line with the shaft 340.

As with the embodiment shown in FIG. 1, power take off (PTO) provisions are easily made, with the gears 318, 336, 364 and 366 being conveniently available for use with conventional PTO takeoff mechanism, as are the shafts 340 and 363, and their possible extensions. Also, the shafts of such pumps as may be chosen to provide signal pressures for automatic controls and operating pressures for clutches may be used for PTO purposes. As with the embodiment of FIG. 1, the gears 318, 336 and 338 and the shaft 340 provide an engine-driven PTO, while the gears 364, 366 and 368 and the shaft 362 provide a hydraulically coupled variable speed PTO.

As will now be apparent from an inspection of FIG. 7, when the first clutch 260 is energized, the first, second, third and fourth planetary gearsets 250, 252, 254, and 256 act as a compounding differential mechanism and a fifth gearset 258 provides further gear reduction, for an overall deep reduction. With the second clutch 262 engaged, the gear ratio is decreased. With the third clutch 264 engaged, the fifth planetary gearset 258 is effectively partially bypassed as part of the power path, yielding a still lower gear ratio, and, with the fourth clutch 266 engaged, the fifth sun gear 304 and the fifth planet gear carrier 306 are effectively fastened together. If, at this time, the third clutch 264 is also engaged, the input shaft 316 is directly connected to the ring and the sun gears 300 and 296 of the fourth planetary gearset 256, which has its planet gear carrier 298 connected to the output shaft 330, providing a one-to-one ratio.

Figure 12:
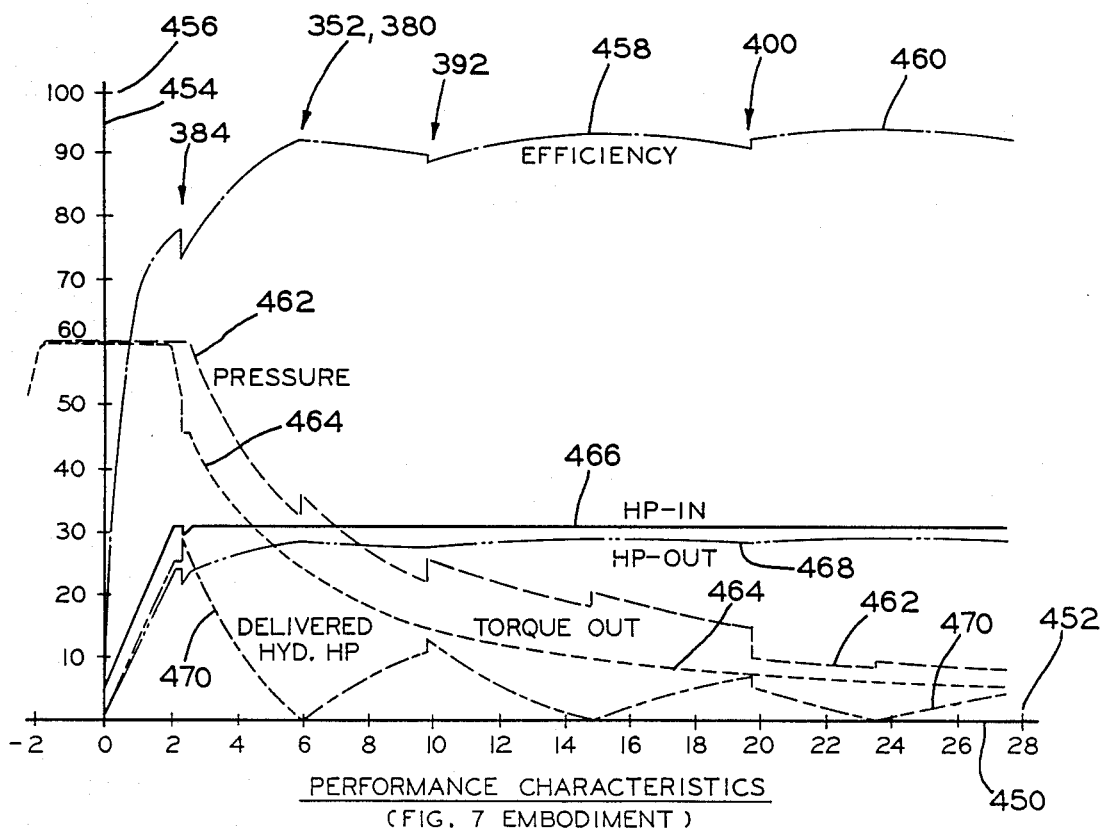

Turning finally to FIG. 12, there are shown various performance curves for the second preferred embodiment of the invention shown in FIG. 2, with the performance differences of greater low speed efficiency and lesser high speed efficiency than the first preferred embodiment shown in FIG. 1, as discussed above. As in corresponding FIG. 7, a horizontal axis 450 is calibrated in hundreds of revolutions per minute, with a full scale point 452 representing two thousand eight hundred rpm. A vertical axis 454 is calibrated in units which are differently interpretable, with a full scale value point 454 representing 100% efficiency, 10,000 psi of oil pressure, 1,000 hp of power, or 10,000 Ft-Lb of torque.

As shown by a curve 458, representing the efficiency, efficiency increases quite steeply with shaft speed at low values and slower thereafter, reaching a maximum value at a point 460 of about 94%, about 2% less than the efficiency of the transmission of FIG. 1. The stepped portions of this curve represent uncertainties at transition points and do not imply sudden changes in rates of acceleration, known as jerk.

A curve 462 represents the hydraulic pressure in the variable and the fixed displacement hydraulic units 342 and 354, which gradually decreases with speed so that the losses associated with hydraulic pressure also decrease with speed.

A curve 462 represents the torque available at the output shaft 330. It may be noted that the available initial or starting torque is higher than that of the first embodiment shown in FIG. 6.

A pair of curves 466 and 468 represent horsepower as applied to the input shaft 316, and as available from the output shaft 330. As usual, where the torque, such as shown by the curve 464 is constant, the horsepower, being the product of the torque and the rpm, (and a constant) must change with the speed, while when the horsepower is constant, the torque must change with the speed. Finally, a curve 470 represents the delivered hydraulic horsepower, or the contribution of the variable and the fixed displacement hydraulic units 342 and 354 to the horsepower available at the shaft 362.

In summary, two versions of a four range overdrive hydromechanical transmission have been disclosed, each having two clutches used as brakes, and two other clutches near one end of the transmission, thereby providing significant manufacturing advantages. One version uses four planetary gearsets for high speed efficiency maximization, and one uses five planetary gearsets for low speed efficiency maximization. In each version, the planetary gearsets chosen so that most or all rotating elements move as a single unit at three operating speeds, reducing losses and allowing a smooth lockup in direct drive, if desired, without additional components.

Numerous modifications and variations of these embodiment of the invention will be obvious to one skilled in the art, and may be made without departing from the spirit and scope of the invention as claimed.

What is claimed is:

1. A hydromechanical transmission, comprising:

means for producing first, second, third and fourth transmission ranges, said first range including a reverse gear range and said fourth range being an overdrive range;

said means including an input shaft, an output shaft, first, second, third and fourth clutch means, and at least first, second, third and fourth planetary gearsets, each of said planetary gearsets including a respective sun gear means, planet gears rotatably mounted on a carrier means, and a ring gear means;

said means further including a fixed displacement hydraulic unit hydraulically interconnected to a variable displacement hydraulic unit, said variable displacement unit being operably connected to said input shaft and including swash plate means variable from a first extreme position to a second extreme position through a central position, and said fixed displacement unit being operably connected to said output shaft;

said reverse gear range of said first transmission range being defined when said first clutch means is engaged and said swash plate means is positioned between said first extreme position and said centered position, said centered position of said swash plate means in said first transmission range defining a neutral position, and a forward gear range of said first transmission range being defined when said swash plate means is positioned between said centered position and said second extreme position;

an upward transition between said first and second transmission ranges defining a first shift point and being produced by sequentially engaging said second clutch means and disengaging said first clutch means while said swash plate means is positioned at said second extreme position and said second clutch means is nonrotating;

an upward transition between said second and third transmission ranges defining a second shift point and being produced by sequentially engaging said third clutch means and disengaging said second clutch means while said swash plate means is positioned at said first extreme position and said third clutch means is nonrotating;

an upward transition between said third and fourth transmission ranges defining a third shift point and being produced by sequentially engaging said fourth clutch means and disengaging said third clutch means while said swash plate means is positioned at said second extreme position and said fourth clutch means is nonrotating;

said fourth overdrive transmission range being defined where said fourth clutch is engaged and said swash plate means is moved between said second extreme position where said input shaft and said output shaft rotate at an identical speed and said first extreme position where said output shaft rotates falter than said input shaft rotates.

2. A hydromechanical transmission according to claim 1 wherein:
said planetary gearsets are selected so that substantially all of the ring gear means and carrier means and sun gear means are at rest with respect to each other at three transmission operating points, and substantially all the planet gears of said planetary gearsets are nonrotating at said three transmission operating points, one said transmission operating point being defined when said output shaft is nonrotating and a second such point being defined when said input and output shafts are rotating at identical speeds, and a third such transmission operating point being intermediate said first and second operating points, so that stirring losses in said transmission are reduced.

3. A hydromechanical transmission according to claim 2 wherein said planetary gearsets are selected so that all said ring gear means, carrier means and sun gear means are at rest with respect to each other at said third operating point, and all said planet gears are nonrotating at said third operating point, adapting said transmission means to be mechanically locked and maintained at said second transmission operating point.

4. A hydromechanical transmission according to claim 3, wherein said second transmission operating point is a direct drive operating point.

5. A hydromechanical transmission according to claim 1, wherein said swash plate means is maintainable in said centered position while said transmission is in said fourth range to maintain said transmission in a mechanical overdrive condition, where the amount of hydraulic fluid flowing between said variable displacement hydraulic unit and said fixed displacement hydraulic unit is substantially equal to zero, so that the resulting hydraulic losses are substantially equal to zero.

6. A hydromechanical transmission accoridng to claim 1, wherein:
said input shaft is operably connected to the fourth sun gear means, and to first portions of the third and fourth clutch means;
said second clutch means has a first rotatable portion affixed to said fourth ring gear means and a second non-rotatable portion, said second clutch means acting as first brake means;
said fourth carrier means is operably connected to a second portion of said fourth clutch means, said third ring gear means, and to said first and second carrier means;
a second portion of said third clutch means is operably connected to said third sun gear means and to said second ring gear means;
said first clutch means has a first non-rotatable portion and a second rotatable portion operably connected to said first ring gear means, said first clutch means acting as a second brake means;
said fixed displacement hydraulic unit is operably connected to said output shaft by being operably connected to said first and second sun gear means, said output shaft being operably connected to said third carrier means.

7. A hydromechanical transmission according to claim 1, wherein:
said input shaft is operably connected to said fourth sun gear means and to a first portion of said third clutch means;
said fourth carrier means is operably connected to a first portion of said fourth clutch means, to said third ring gear means and to said first and second carrier means;
a second portion of said third clutch means is operably connected to a second portion of said fourth clutch means and to said third sun gear means;
said third carrier means is operably connected to said second ring gear means;
said first ring gear means is operably connected to a first rotatable portion of said first clutch means, a second portion of said first clutch means being a non-rotatable portion, said first clutch means acting as a first brake means;

said fourth ring gear means is operably connected to a first rotatable portion of said second clutch means, a second portion of said second clutch means being a non-rotatable portion, said second clutch means acting as second brake means;

and said fixed hydraulic unit is operably connected to said output shaft by being operably connected to said first and second sun gear means, said output shaft being operably connected to said third carrier means and to said second ring gear means.

8. A hydromechanical transmission according to claim 1, wherein:

said transmission includes a fifth planetary gearset including respective planet gear means and carrier means and a respective sun gear means and ring gear means;

said input shaft is operably connected to said fifth sun gear means and to a first portion of said third clutch means and to a first portion of said fourth clutch means;

said fifth carrier means being operably connected to a second portion of said fourth clutch means, to said fourth ring gear means, to said first carrier means, to ssaid second carrier means and to said third ring gear means;

a second portion of said third clutch means is operably connected to said fourth sun gear means;

said first ring gear means being operably connected to a first rotatable portion of said first clutch means, a second portion of said first clutch means being a non-rotatable portion, said first clutch means acting as a first brake means;

said fifth ring gear is operably connected to a first rotatable portion of said second clutch means, a second portion of said second clutch means being a non-rotatable portion, said second clutch means acting as a second brake means;

said second ring gear means is operably connected to said third sun gear means; and said fixed displacement hydraulic unit is operably connected to said output shaft by being operably connected to said first and second sun gear means, said output shaft being operably connected to said third and fourth carrier means.

* * * * *